US012364956B2

(12) United States Patent
Zhu

(10) Patent No.: US 12,364,956 B2
(45) Date of Patent: Jul. 22, 2025

(54) METHOD FOR CONFINED IMPINGING JETS MIXING WITH IMBALANCED MOMENTA

(71) Applicants: YANGZHOU UNIVERSITY, Suzhou (CN); Zhengxi Zhu, Jiangsu (CN)

(72) Inventor: Zhengxi Zhu, Jiangsu (CN)

(73) Assignees: YANGZHOU UNIVERSITY, Jiangsu (CN); Zhengxi Zhu, Jiangsu (CN)

( * ) Notice: Subject to any disclaimer, the term of this patent is extended or adjusted under 35 U.S.C. 154(b) by 771 days.

(21) Appl. No.: 17/564,273

(22) Filed: Dec. 29, 2021

(65) Prior Publication Data

US 2022/0118414 A1 Apr. 21, 2022

Related U.S. Application Data

(63) Continuation-in-part of application No. PCT/CN2019/106070, filed on Sep. 17, 2019.

(30) Foreign Application Priority Data

Aug. 30, 2019 (CN) ........................ 201910821015.7

(51) Int. Cl.
*B01F 25/23* (2022.01)
*B01F 23/40* (2022.01)
(Continued)

(52) U.S. Cl.
CPC ............ *B01F 25/23* (2022.01); *B01F 23/405* (2022.01); *B01F 23/453* (2022.01);
(Continued)

(58) Field of Classification Search
CPC ........................................................ B01F 25/23
(Continued)

(56) References Cited

U.S. PATENT DOCUMENTS 2,751,335 A * 6/1956 Carver .................... B01F 25/23 208/158
2,751,425 A * 6/1956 Rupp ...................... B01F 25/23 585/714
(Continued)

FOREIGN PATENT DOCUMENTS

CN 203790836 8/2014
CN 105148758 11/2017
(Continued)

OTHER PUBLICATIONS

Jing Han et al., "A simple confined impingement jets mixer for flash nanoprecipitation," Journal of Pharmaceutical Sciences, Oct. 2012, pp. 4018-4023.

*Primary Examiner* — David L Sorkin
(74) *Attorney, Agent, or Firm* — JCIP GLOBAL INC.

(57) ABSTRACT

The present invention discloses a method for confined impinging jets (CIJ) mixing with imbalanced momenta. The method includes the following steps: connecting each inlet of a CIJ mixer with a to-be-mixed fluid by using an inlet conduit; connecting an outlet of the mixer with an inlet of a suction device by using an outlet conduit; and starting the suction device, enabling the to-be-mixed fluids to enter the mixer sequentially through the conduits and the inlets of the mixer and to mix in a mixer chamber, and the mixture is then sucked out from the outlet of the mixer and flows sequentially through the conduit, the inlet of the suction device, and the outlet of the suction device.

15 Claims, 2 Drawing Sheets

(51) Int. Cl.
*B01F 23/45* (2022.01)
*B01F 35/71* (2022.01)

(52) U.S. Cl.
CPC .... *B01F 35/718* (2022.01); *B01F 2215/0427* (2013.01); *B01F 2215/0431* (2013.01); *B01F 2215/0459* (2013.01)

(58) Field of Classification Search
USPC ............................................ 366/162.4, 162.5
See application file for complete search history.

(56) References Cited

U.S. PATENT DOCUMENTS

| | | | | | |
|---|---|---|---|---|---|
| 3,833,718 | A | * | 9/1974 | Reed | B01F 25/432<br>166/305.1 |
| 3,884,388 | A | * | 5/1975 | Holcomb | B01F 25/23<br>222/145.5 |
| 4,764,283 | A | * | 8/1988 | Ashbrook | C02F 1/482<br>210/695 |
| 5,523,063 | A | * | 6/1996 | Anderson | B01F 25/23<br>239/545 |
| 5,540,497 | A | * | 7/1996 | Addeo | B29B 7/7694<br>366/173.1 |
| 2004/0091546 | A1 | | 5/2004 | Johnson et al. | |
| 2010/0163114 | A1 | | 7/2010 | Yoshizawa et al. | |

FOREIGN PATENT DOCUMENTS

| | | |
|---|---|---|
| CN | 108607462 | 10/2018 |
| CN | 113769599 | 12/2021 |

* cited by examiner

METHOD FOR CONFINED IMPINGING JETS MIXING WITH IMBALANCED MOMENTA

CROSS-REFERENCE TO RELATED APPLICATION

This is a continuation-in-part application of International Application No. PCT/CN2019/106070, filed on Sep. 17, 2019, which claims the priority benefits of China Application No. 201910821015.7, filed on Aug. 30, 2019. The entirety of each of the above-mentioned patent applications is hereby incorporated by reference herein and made a part of this specification.

TECHNICAL FIELD

The present invention relates to methods for confined impinging jets mixing, in particular to a method for confined impinging jets mixing with imbalanced momenta.

BACKGROUND

Confined impinging jets (CIJ) mixing can be used in the flash nanoformation (FNF) technology to rapidly, effectively, energy-savingly, and continuously prepare nanosuspensions via the flash nanoprecipitation (FNP) method (US Patent application US20040091546A1), nanoemulsions via the flash nanoemulsification (FNE) method (Chinese Patent CN105148758B), or nanobubbles with the flash nanobubbling (FNB) method (Chinese Patent application No. CN202111003726.7). A supersaturation of a solute is instantly built in a closed and tiny chamber of the CIJ mixer by instantly mixing two or more fluids, and then hydrophobic molecules aggregate to form nano-sized solid particles, liquid droplets, or gas bubbles. The conventional CIJ-D method (*Journal of Pharmaceutical Sciences* 2012, 101, 4018) adopts a mode of injecting fluids into the inlets of the mixer. Approximately equal momenta of the two impinging jets in the chamber are required. Otherwise, one jet with a large momentum would push another with a small momentum back into the jet nozzle, greatly influencing the mixing quality. Mixing with such approximately equal momenta determines the flow rate ratio of the two impinging jets is close to 1:1, resulting that a considerable portion of the hydrophobic solute is not yet precipitated out to form nanoparticles. Therefore, the mixture is required for a secondary dilution after flowing out of the mixer. Due to this secondary dilution, a particle size for each batch is difficult to keep consistent, the average particle size would increase, and the distribution would broaden. Another approach to avoid this backflow and secondary dilution is to use tangential jets rather than opposed jets, but the mixing quality would significantly decrease. In addition, in the conventional CIJ-D method, the flow rates at the mixer inlets need to be controlled independently and synchronously, requiring a sophisticated equipment and control system with a low latency and so as a complicated operation. Moreover, in order to ensure a steady flow rate ratio, the input pressure right ahead of the conduit connecting the mixer inlet needs to significantly enhance, and overwhelms a random pressure fluctuation due to the interference between the powder source and a flow in the adjacent conduit. Power sources with a large output are thus required.

SUMMARY

Purpose: The present invention aims to provide a method for confined impinging jets mixing with imbalanced momenta.

Technical Scheme: The present invention provides a method for confined impinging jets mixing with imbalanced momenta, and the method comprises the following steps: connecting each inlet of a mixer with a to-be-mixed fluid by using an inlet conduit; connecting an outlet of the mixer with an inlet of a suction device by using an outlet conduit; and starting the suction device, enabling the to-be-mixed fluids to enter the mixer sequentially through the inlet conduits and the inlets of the mixer and to mix in a chamber of the mixer, and sucking out a mixture from the outlet of the mixer, which then flows sequentially through the outlet conduit, the inlet of the suction device, and the outlet of the suction device.

Further, the mixer has at least two inlets, at least one outlet, and at least one chamber.

Further, the chamber of the mixer is space-closed and at least one chamber has a volume of no more than 100 μL.

The chamber of the mixer is space-closed to ensure that the mixer is gastight, and the fluid at the inlet of the mixer can be stably sucked into the mixer when the outlet of the mixer is sucked; the chamber of the mixer as described above has a volume of no more than 100 μL, so that the mixing is ensured to be volume-confined mixing. The small volume also ensures a high energy per volume in the chamber and thus a vigorous, instant and homogeneous mixing even driven by a low energy input.

Further, the diameter of the inlet conduit is not less than 0.5 mm; the smallest diameter of the nozzles of the chamber of the mixer is not less than 0.5 mm.

The diameter of the inlet conduit needs to be no less than the diameter of the smallest diameter of the nozzles of the chamber of the mixer.

Further, the fluid in the chamber of the mixer is in turbulence, and a Reynolds number at the outlet of the mixer is not less than 1000.

The Reynolds number of no less than 1000 ensures that the fluids in the chamber is in turbulence and homogeneously mixed.

Further, the major components of the to-be-mixed fluids are miscible liquids.

The major components of the to-be-mixed fluids are miscible so as be able to form a continuous phase.

Further, the fluid sucked out of the chamber of the mixer is a solution, a suspension, an emulsion, an aqueous dispersion of bubbles, or any of their combination.

Further, regulating valves are arranged on the inlet conduits.

Further, the suction device consumes the energy of no higher than 1 W for sucking out the fluid from the outlet, and can be either a manually operated or electrically powered.

Further, the equivalent lengths of the inlet conduits are not all identical, the equivalent inner diameters of the inlet conduits are not all identical, the opening of the regulating valves on the inlets are not all identical, or the roughness of the interior walls of the inlet conduits are not all identical, and any one or combination of the above can be subjected to confined impinging jets mixing with imbalanced momenta.

In the above described method, according to the Hagen-Poiseuille equation, a pressure drop of a fluid in a conduit is inversely proportional to the $4^{th}$ power of the equivalent diameter of the conduit and linearly proportional to the equivalent length of the conduit, so that the smaller the equivalent length of the conduit or the larger the equivalent diameter is, the larger the momentum of the jet impingement in the chamber of the mixer is.

In addition, when the larger the opening of the regulating valves arranged on the inlet conduits is, the smaller the roughness of the interior walls of inlet conduits is, or the smaller the pressure drop of the fluids in the inlet conduits is, the larger the momentum of the jet impingement in the chamber of the mixer is.

In the above described method, when the fluids are instantly mixed in the chamber of the mixer, an intermolecular chemical reaction or intermolecular physical reaction of aggregation can occur to form a solution of dispersed molecules, a suspension of solid particles, an emulsion of liquid droplets, an aqueous dispersion of gas bubbles or a combination, which then flows out of the outlet of the mixer.

The method disclosed herein adopts a mode of sucking fluids from the outlet of the mixer, and realizes a large momentum ratio among impinging jets in the chamber of the mixer as well as a regulation of the flow rate ratio by regulating the pressure drop of fluids in the inlet conduits of the mixer without a secondary dilution, such as regulating the equivalent diameter of the inlet conduit, the equivalent length of the inlet conduit, the opening of the regulating valve, the roughness degree of the interior walls of the inlet conduit, or a combination. Meanwhile, the method replaces the synchronous control of the flow rates of multiple mixer inlets with the control of rather the flow rate of a single outlet, greatly simplifying the operation, the equipment and the control system. Either independent and high power sources or a synchronous and sophisticated control system with a low latency is not needed any more. The consumed energy the suction device for sucking the fluid is no higher than 1 W, and even can be operated by a manually operated sprayer. The present invention names this method as the imbalanced momentum confined impinging jets (IMCIJ) mixing, and the corresponding mixing device is named as an IMCIJ mixing device.

Beneficial Effects: The method disclosed herein can realize imbalanced momenta of confined impinging jets mixing and an adjustment of flow rate ratio without a secondary dilution, and is characterized as a low power input, a simple apparatus, a convenient operation, and an easiness of flow system controls. The nanoparticles prepared by the method disclosed herein have a smaller particle size and narrower size distribution than ones by a conventional method.

DETAILED DESCRIPTION

Figure 1:
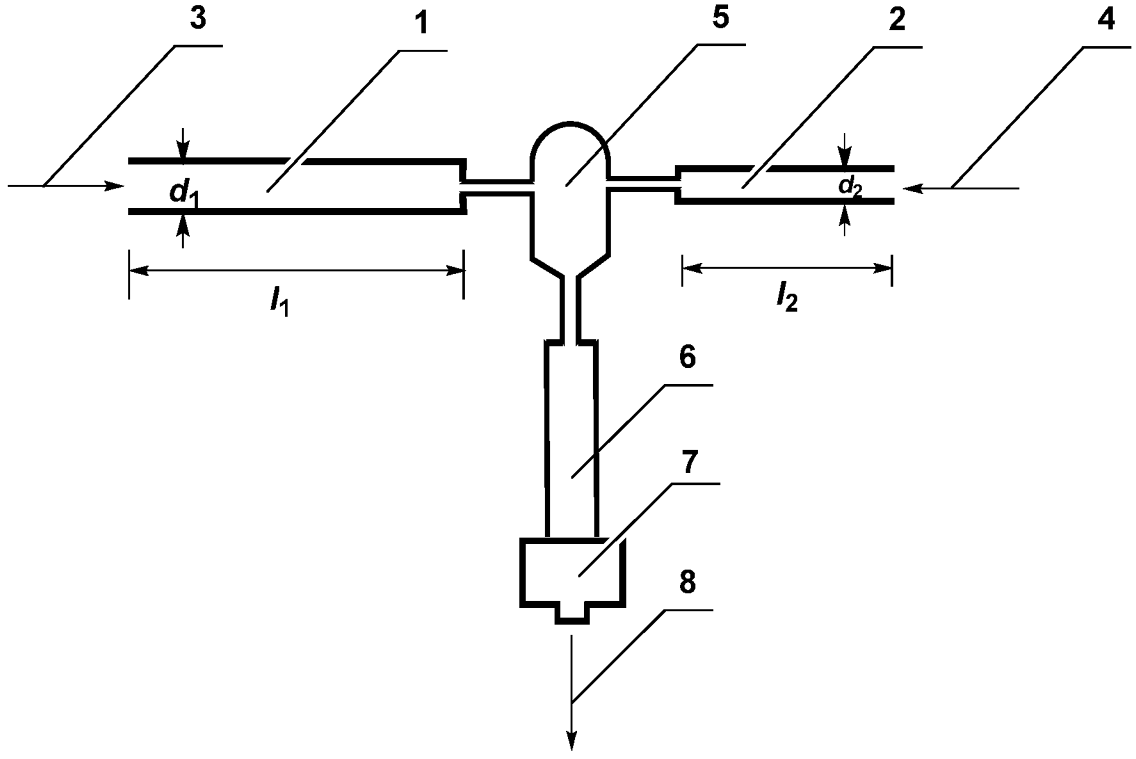
FIG. 1 is a schematic diagram of the working principle of the present invention.
Figure 2:
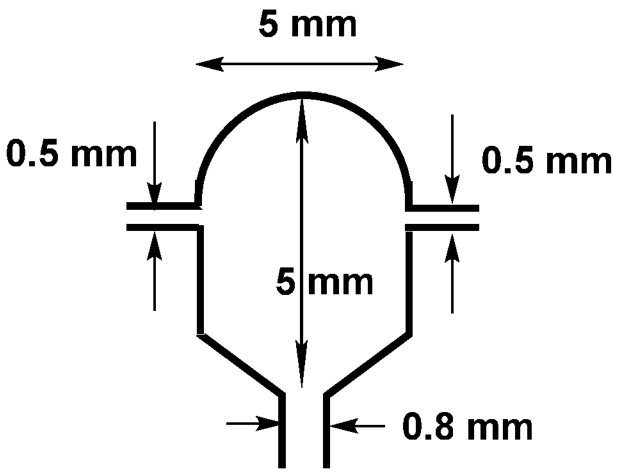
FIG. 2 is a figure of the dimensions of the CIJ mixer.

As shown in FIG. 1, two inlets of a CIJ mixer 5 are connected with to-be-mixed fluids 3 and 4 by using inlet conduits 1 and 2, respectively; an outlet of the mixer 5 is connected with an inlet of a suction device 7 by using an outlet conduit 6; the suction device 7 is started; and the fluids 3 and 4 enter the mixer 5 through the inlet conduits 1 and 2 respectively, are mixed in a chamber of the mixer 5 to be the mixed fluid 8, are sucked out from the outlet of the mixer 5, flow sequentially through an outlet conduit 6 and an inlet of the suction device 7, and finally flow out of an outlet of the suction device 7. $l_1$ and $l_2$ are the lengths of the conduits 1 and 2, respectively, and $d_1$ and $d_2$ are the diameters of the inlet conduits 1 and 2, respectively. FIG. 2 shows the dimensions of the CIJ mixer used in the following cases.

Embodiment 1: The fluids 3 and 4 are both aqueous solutions and IMCIJ mixed. (changing $d_1$ and $d_2$, when $l_1$=$l_2$=20.0 cm, the interior walls of the inlet conduits 1 and 2 have an identical roughness, and the regulating valves of the inlet are fully open.)

The aqueous solutions are mixed as described above for 10 seconds, and the volume of the aqueous solution sucked in from each of the conduits 1 and 2 is measured. The volumetric flow rate ratio of the fluids at the two inlets is calculated, and the results are shown in Table 1. The suction device is a manually operated sprayer with an estimated energy consumption of less than 0.1 W in all cases. The results show that the ratio of the two fluids can be regulated by changing the diameter of the inlet conduits, and the imbalanced momenta of the confined impinging jets mixing are realized.

TABLE 1

Realization of the regulation of the flow rate ratio of fluids at the inlets by changing $d_1$ and $d_2$, when $l_1 = l_2 = 20.0$ cm, the interior walls of the inlet conduits 1 and 2 have an identical roughness, and the regulating valves of the inlet are fully open

| No. | Diameter of conduit 1 $d_1$ (mm) | Diameter of conduit 2 $d_2$ (mm) | Volume of fluid 3 $V_1$ (mL) | Volume of fluid 4 $V_2$ (mL) | Volume of fluid 8 $V_0$ (mL) | Volumetric flow rate ratio of fluids at the inlets $V_1/V_2$ |
|---|---|---|---|---|---|---|
| 1 | 0.8 | 0.8 | 20.0 | 20.0 | 40.0 | 1.0 |
| 2 | 1.6 | 0.8 | 20.0 | 8.0 | 28.0 | 2.5 |
| 3 | 3.2 | 0.8 | 20.0 | 6.0 | 26.0 | 3.3 |
| 4 | 0.8 | 0.5 | 20.0 | 3.5 | 23.5 | 5.7 |
| 5 | 1.6 | 0.5 | 20.0 | 1.5 | 21.5 | 13.3 |
| 6 | 3.2 | 0.5 | 20.0 | 1.0 | 21.0 | 20.0 |

Embodiment 2: The fluids 3 and 4 are both aqueous solutions and IMCIJ mixed (changing $l_1$ and $l_2$, when $d_1$ and $d_2$=0.8 mm, the interior walls of the inlet conduits 1 and 2 have an identical roughness, and the regulating valves of the inlet are fully open.)

The aqueous solutions are mixed as described above for 10 seconds, and the volume of the aqueous solution sucked in from each of the conduits 1 and 2 is measured. The volumetric flow rate ratio of the fluids at the two inlets is calculated, and the results are shown in Table 2. The suction device is a manually operated sprayer with an estimated energy consumption of less than 0.1 W in all cases. The results show that the ratio of the two fluids can be regulated by changing the diameter of the inlet conduits, and imbalanced momenta of the confined impinging jets mixing are realized. The results show that the ratio of the two fluids can be regulated by changing the length of the inlet conduits, and the imbalanced momenta of the confined impinging jets mixing are realized.

TABLE 2

Realization of regulation of flow rate ratio of fluids at the inlets by changing $l_1$ and $l_2$ when $d_1 = d_2 = 0.8$ mm, the inlet conduits have the same interior wall roughness and the regulating valves of the inlet are fully open

| No. | Length of conduit 1 $l_1$ (cm) | Length of conduit 2 $l_2$ (cm) | Volume of fluid 3 at the inlet $V_1$ (mL) | Volume of fluid 4 at the inlet $V_2$ (mL) | Volume of fluid 8 at the outlet $V_0$ (mL) | Volumetric flow rate ratio of fluids at the inlets $V_1/V_2$ |
|---|---|---|---|---|---|---|
| 1 | 20 | 100 | 20.0 | 9.5 | 24.0 | 2.1 |
| 2 | 20 | 80 | 20.0 | 10.1 | 25.0 | 2.0 |
| 3 | 20 | 60 | 20.0 | 12.1 | 26.6 | 1.7 |
| 4 | 20 | 40 | 20.0 | 14.2 | 30.0 | 1.4 |
| 5 | 20 | 30 | 20.0 | 16.3 | 33.3 | 1.2 |
| 6 | 20 | 20 | 20.0 | 20.0 | 40.0 | 1.0 |

Embodiment 3: The fluids 3 and 4 are both aqueous solutions and IMCIJ mixed (Regulating the opening of the regulating valves, when $l_1=l_2=20.0$ cm, $d_1=d_2=0.8$ mm, and the interior walls of the inlet conduits 1 and 2 have an identical roughness.)

The regulating valves are arranged on the conduits 1 and 2 and regulated. The aqueous solutions are mixed as described above for 10 seconds, and the volume of the aqueous solution sucked in from each of the conduits 1 and 2 is measured. The volumetric flow rate ratio of the fluids at the two inlets is calculated. The suction device is a manually operated sprayer with an estimated energy consumption of less than 0.1 W. The results show that by regulating the opening of the regulating valve from the fully-opened 1 to the fully-closed 0, the smaller the opening value is, the larger the pressure drop of the inlet conduit is, and the smaller the flow rate is. Therefore, the ratio of the two fluids can be regulated by regulating the opening of the regulating valves on the inlet conduits 1 and 2, and the imbalanced momenta of the confined impinging jets mixing are realized.

Embodiment 4: Comparison of $CoQ_{10}$ suspensions prepared by IMCIJ mixing and CIJ-D mixing $CoQ_{10}$ nanosuspensions are prepared with a chitosan aqueous solution (pH=4, 0.053 mg/mL) as the fluid 3 and a solution (0.48 mg/mL) of $CoQ_{10}$ in ethanol as the fluid 4 by using the IMCIJ mixing method described above, and the conventional CIJ-D mixing with an equal-volume. In the IMCIJ mixing method, $l_1$ and $l_2$ are 20.0 cm, the regulating valves on the inlets are fully opened, and the interior walls of the inlet conduits 1 and 2 have an identical roughness. $d_1$ is set as 1.2 mm, and $d_2$ is 0.5 mm. The aqueous solutions are mixed for 5 seconds. The volume of the fluid 3 (the chitosan aqueous solution) sucked in is 9 mL, and the volume of the fluid 4 (the ethanol solution) sucked in is 1 mL. The Reynolds number at the outlet is about 3000. 10 mL of the chitosan-stabilized $CoQ_{10}$ (0.048 mg/mL) nanosuspension is thus obtained after the mixing. The average particle size is 192 nm, and the polydispersity index is 0.17. In the CIJ-D mixing method, 1 mL of the fluid 3 and 1 mL of the fluid 4 are injected into a CIJ mixer simultaneously, and flow out into 8 mL of the fluid 3. 10 mL of the $CoQ_{10}$ (0.048 mg/mL) nanosuspension is thus obtained, wherein the volumetric ratio of the fluid 3 to the fluid 4 is 9:1. The average particle size is 286 nm and the polydispersity index is 0.30. By comparing the $CoQ_{10}$ nanosuspensions stabilized with the same concentration of chitosan as well as with the same components but prepared by the two methods, the particle size of the nanosuspension obtained by the IMCIJ mixing method is smaller, and the distribution is narrower than the ones by the CIJ-D mixing method, showing the advantages of the IMCIJ mixing.

TABLE 3

Average particle size and polydispersity index of $CoQ_{10}$ (0.048 mg/mL) nanosuspensions prepared by the two methods

| Mixing mode | Average diameter of particles (nm) | Polydispersity index of particle size |
|---|---|---|
| IMCIJ mixing | 192 | 0.17 |
| CIJ-D mixing | 286 | 0.30 |

What is claimed is:

1. A method for confined impinging jets mixing with imbalanced momenta, comprising:

connecting each inlet of a mixer with a to-be-mixed fluid by using an inlet conduit;

connecting an outlet of the mixer with an inlet of a suction device by using an outlet conduit; and starting the suction device, enabling the to-be-mixed fluids to enter the mixer sequentially through the inlet conduits and the inlets of the mixer and to mix in a chamber of the mixer, and sucking out a mixture from the outlet of the mixer, which then flows sequentially through the outlet conduit, the inlet of the suction device, and the outlet of the suction device, wherein the mixer has at least two inlets, at least one outlet, and at least one chamber, wherein the at least two inlets connect to the at least one chamber, wherein the at least one chamber has a volume of no more than 100 μL, wherein the fluids in the chamber of the mixer is in turbulence.

2. The method for confined impinging jets mixing with imbalanced momenta according to claim 1, wherein the shortest distance between any of two nozzles of the chamber of the mixer is not larger than 5.0 mm.

3. The method for confined impinging jets mixing with imbalanced momenta according to claim 1, wherein the inlet conduit has a diameter of no less than 0.5 mm; the smallest diameter of nozzles of the chamber of the mixer is not less than 0.5 mm.

4. The method for confined impinging jets mixing with imbalanced momenta according to claim 1, wherein a Reynolds number at the outlet of the mixer is not less than 1000.

5. The method for confined impinging jets mixing with imbalanced momenta according to claim 1, wherein major components of the to-be-mixed fluids are miscible liquids.

6. The method for confined impinging jets mixing with imbalanced momenta according to claim 1, wherein the mixture sucked out of the chamber of the mixer can be a solution, a suspension, an emulsion, an aqueous dispersion of bubbles, or any of their combination.

7. The method for confined impinging jets mixing with imbalanced momenta according to claim 1, wherein regulating valves are arranged on the inlet conduits.

8. The method for confined impinging jets mixing with imbalanced momenta according to claim 1, wherein the suction device consumes the energy of no higher than 1 W for sucking out the fluid from the outlet, and can be either a manually operated or electrically powered.

9. The method for confined impinging jets mixing with imbalanced momenta according to claim 1, wherein equivalent lengths of the inlet conduits are not all identical, equivalent inner diameters of the inlet conduits are not all identical, opening of regulating valves on the inlet conduits are not all identical, or roughness of interior walls of the inlet conduits are not all identical, and any one or combination of the above can be subjected to confined impinging jets mixing with imbalanced momenta.

10. The method for confined impinging jets mixing with imbalanced momenta according to claim 2, wherein equivalent lengths of the inlet conduits are not all identical, equivalent inner diameters of the inlet conduits are not all identical, opening of regulating valves on the inlet conduits are not all identical, or roughness of interior walls of the inlet conduits are not all identical, and any one or combination of the above can be subjected to confined impinging jets mixing with imbalanced momenta.

11. The method for confined impinging jets mixing with imbalanced momenta according to claim 3, wherein equivalent lengths of the inlet conduits are not all identical, equivalent inner diameters of the inlet conduits are not all identical, opening of regulating valves on the inlet conduits are not all identical, or roughness of interior walls of the inlet conduits are not all identical, and any one or combination of the above can be subjected to confined impinging jets mixing with imbalanced momenta.

12. The method for confined impinging jets mixing with imbalanced momenta according to claim 4, wherein equivalent lengths of the inlet conduits are not all identical, equivalent inner diameters of the inlet conduits are not all identical, opening of regulating valves on the inlet conduits are not all identical, or roughness of interior walls of the inlet conduits are not all identical, and any one or combination of the above can be subjected to confined impinging jets mixing with imbalanced momenta.

13. The method for confined impinging jets mixing with imbalanced momenta according to claim 5, wherein equivalent lengths of the inlet conduits are not all identical, equivalent inner diameters of the inlet conduits are not all identical, opening of regulating valves on the inlet conduits are not all identical, or roughness of interior walls of the inlet conduits are not all identical, and any one or combination of the above can be subjected to confined impinging jets mixing with imbalanced momenta.

14. The method for confined impinging jets mixing with imbalanced momenta according to claim 6, wherein equivalent lengths of the inlet conduits are not all identical, equivalent inner diameters of the inlet conduits are not all identical, opening of regulating valves on the inlet conduits are not all identical, or roughness of interior walls of the inlet conduits are not all identical, and any one or combination of the above can be subjected to confined impinging jets mixing with imbalanced momenta.

15. The method for confined impinging jets mixing with imbalanced momenta according to claim 7, wherein equivalent lengths of the inlet conduits are not all identical, equivalent inner diameters of the inlet conduits are not all identical, opening of previously presented regulating valves on the inlet conduits are not all identical, or roughness of interior walls of the inlet conduits are not all identical, and any one or combination of the above can be subjected to confined impinging jets mixing with imbalanced momenta.

* * * * *